(No Model.)
L. H. NASH.
DISK WATER METER.
No. 527,539. Patented Oct. 16, 1894.
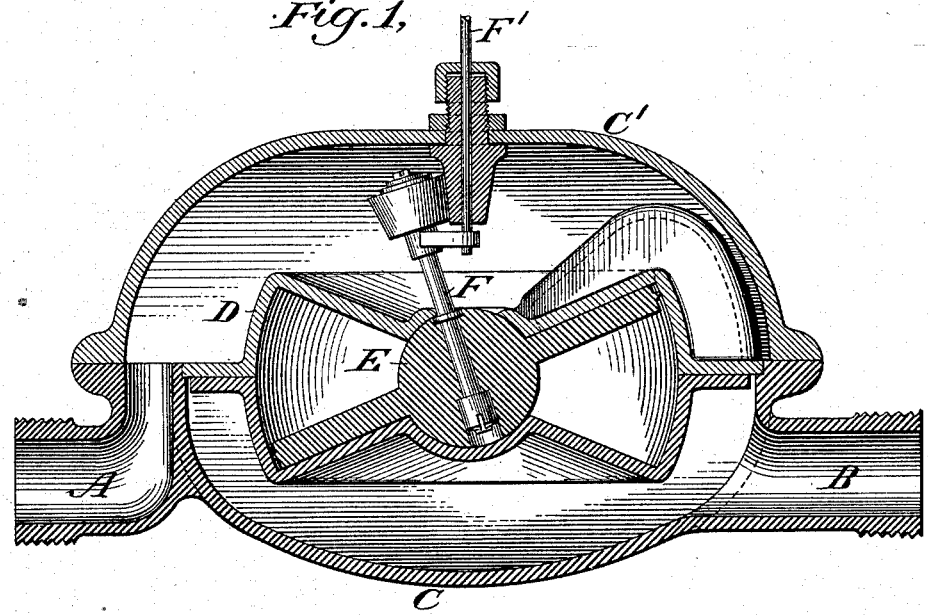
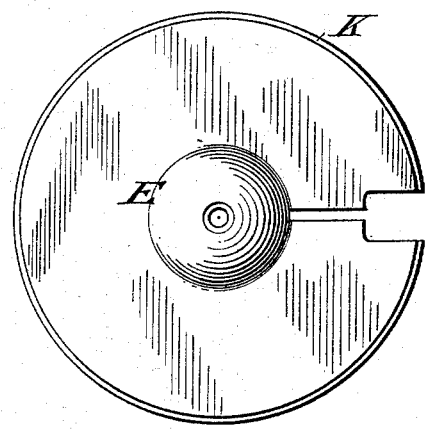
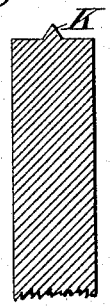
Witnesses:—
Edwin L. Bradford
Van Buren Hillyard.
Inventor:—
Lewis Hallock Nash
By Johnson & Johnson
Attorneys.

UNITED STATES PATENT OFFICE.

LEWIS HALLOCK NASH, OF SOUTH NORWALK, CONNECTICUT, ASSIGNOR TO THE NATIONAL METER COMPANY, OF NEW YORK, N. Y.

DISK WATER-METER.

SPECIFICATION forming part of Letters Patent No. 527,539, dated October 16, 1894.

Application filed December 23, 1893. Serial No. 494,558. (No model.)

*To all whom it may concern:*

Be it known that I, LEWIS HALLOCK NASH, a citizen of the United States, residing at South Norwalk, in the county of Fairfield and State of Connecticut, have invented certain new and useful Improvements in Water-Meters, of which the following is a specification.

My invention relates to that class of water meters in which the piston moves upon a fixed bearing, as, for example, a spindle or ball, and it consists of certain novel parts and combinations of parts specifically pointed out in the claims concluding this specification.

The following is a description of the structure shown in the annexed drawings, which structure embodies in the form at present preferred by me the several features which constitute my present invention; but it will be understood that my invention is not limited to the precise forms shown or to the precise combinations as various modifications may be made without departing from the spirit of my invention and without exceeding the scope of the concluding claims.

In the drawings, Figure 1 is a vertical section through a water meter having a nutating piston. Fig. 2 is a top view of the piston and Fig. 3 a portion thereof on an enlarged scale.

Similar letters of reference indicate the same parts in all the figures.

I have shown in the drawings a meter of ordinary form consisting of inlet spud A, outlet spud B, case C and C' and inclosing measuring chamber D, formed with spherical side walls and end cones.

E is the piston of ordinary form connected by suitable devices with the spindle F which operates the dial mechanism.

My present invention resides in the piston which is shown in detail in Figs. 2 and 3. The piston is provided at its periphery with a knife-edge projection K. It is well known that wear at the ball bearing of a nutating piston is liable to bring its edge in contact with the spherical walls of the measuring chamber and that thereby the accuracy of the meter is seriously affected and the piston is liable to be injured or broken. I have ascertained by experiment that if the rim of the piston present a comparatively sharp edge to the opposing walls it will free itself after it has been by wear brought in contact therewith. This is due either to the fact that the thin projecting edge K acts as a cutting tool upon the spherical walls of the case, or to the fact that the spherical walls themselves wear down the knife edge projection on the piston. I believe that both actions take place according to the nature of the materials used in the piston and case, but whatever may be the operation, the fact is that a piston provided with such a knife edge will possess the power of freeing itself after it has been brought in contact with its case without seriously affecting the accuracy of the device as a meter and without endangering the life of its parts. I have demonstrated by experiment that the edge of the piston in order to have the capacity described must be brought down to a thin or sharp section and that it is immaterial how such section be formed or disposed with relation to the edge of the piston. The form at present preferred by me is that shown in the drawings, in which a piston of considerable width at its periphery is provided with a single projection at the center of the rim surface. If preferred, more than one knife edge projection might be employed, or the projection might be placed in other positions than the central one shown in Fig. 3. Instead of providing a piston with a comparatively broad periphery with a knife edge projection I may employ a tapered piston likewise brought to a knife edge. I prefer to use a piston with a comparatively broad periphery, not only because it is stronger but because it acts as a water packing.

This invention is applicable not only to flat disk pistons, such as shown in the drawings, but it may be also applied to pistons of various other shapes as, for example, the shapes shown in an application for Letters Patent filed by me December 23, 1893, bearing Serial No. 494,559.

What I claim is—

1. In a nutating piston water meter, a piston provided with a knife edge periphery.

2. In a nutating piston water meter, a piston provided with a knife edge projection on its peripheral surface.

3. In a nutating piston water meter, a piston having a knife edge projection at the center of its peripheral surface.

LEWIS HALLOCK NASH.

Witnesses:
EMMA A. BROWER,
M. WILSON.